United States Patent [19]
Lee et al.

[11] Patent Number: 5,413,955
[45] Date of Patent: May 9, 1995

[54] METHOD OF BONDING SILICON WAFERS AT TEMPERATURES BELOW 500 DEGREES CENTIGRADE FOR SENSOR APPLICATIONS

[75] Inventors: Han-Sheng Lee, Bloomfield Hill, Mich.; Steven E. Staller, Kokomo; Dan W. Chilcott, Sharpsville, both of Ind.

[73] Assignee: Delco Electronics Corporation, Kokomo, Ind.

[21] Appl. No.: 169,117

[22] Filed: Dec. 21, 1993

[51] Int. Cl.6 .................................. H01L 21/20
[52] U.S. Cl. ......................... 437/86; 437/901; 437/974; 148/33.2; 148/DIG. 135
[58] Field of Search ............ 437/62, 86, 974, 901; 148/DIG. 12, DIG. 135, 33.2

[56] References Cited

U.S. PATENT DOCUMENTS

| | | | |
|---|---|---|---|
| 5,098,861 | 3/1992 | Blackstone | 437/200 |
| 5,102,821 | 4/1992 | Moslehi | 437/62 |
| 5,168,078 | 12/1992 | Reisman et al. | 437/195 |
| 5,169,472 | 12/1992 | Goebel | 156/281 |
| 5,260,233 | 11/1993 | Buti et al. | 437/195 |
| 5,286,670 | 2/1994 | Kang et al. | 437/61 |
| 5,290,715 | 3/1994 | Pandya | 437/29 |

OTHER PUBLICATIONS

Haisma et al., Jap. J. Appl. Phys. 28(8) pp. 1426–1433 (1989).
J. B. Lasky, "Wafer Bonding For Silicon–on–Insulator Technologies," Appl. Phys. Lett., 48 (1), 78, 1986.
R. Stengle, K. Y. Ahn and U. Gosele, "Bubble–Free Silicon Wafer Bonding in a Non–Cleanroom Environment," Jpn. J. Appl. Phys., 27, L2384, 1988.
W. P. Massara, G. Goetz, A. Caviglia and J. B. McKitterrick, "Bonding of Silicon Wafers for Silicon–on–Insulator," J. Appl. Phys., 64 (10), 4943, 1988.
K. Mitani and U. Gosele, "Wafer Bonding Technology for Silicon–on–Insulator Applications: A Review", J. Electronic Matl., 21, 669, 1992.
G. G. Goetz, "Semiconductor Wafer Bonding: Science, Technology, and Applications," p. 65, Ed. by W. Gosele, T. Abe, J. Haisoa and M. A. Schmidt, The Electrochemical Society, 1992.
E. Chason and T. M. Mayer, "Low Energy Ion Bombardment Induced Roughening and Smoothing of $SiO_2$ Surfaces", Appl. Phys. Letter 62(4), 25 Jan. 1993, pp. 363–365.

*Primary Examiner*—Olik Chaudhuri
*Assistant Examiner*—Ken Hotron
*Attorney, Agent, or Firm*—Cary W. Brooks; Jimmy L. Funke

[57] ABSTRACT

A process for silicon wafer-to-wafer bonding at temperatures lower than 500° C. has been developed. It consists of (1) treating the cleaned surfaces to make them smooth and hydrophilic, (2) initiating the bond by making intimate contact between wafers and (3) enhancing the bond strength at elevated temperatures. This bonding process can be applied to sensor packaging.

5 Claims, 5 Drawing Sheets

METHOD OF BONDING SILICON WAFERS AT TEMPERATURES BELOW 500 DEGREES CENTIGRADE FOR SENSOR APPLICATIONS

FIELD OF THE INVENTION

This invention relates to a method of bonding wafers, and more particularly to bonding wafers at temperatures below 500° C.

BACKGROUND

The bonding of silicon wafers has been used in SOI (silicon-on-insulator) and various sensor applications. In SOI applications, the wafer bonding step is usually performed prior to any circuit fabrication. The temperature used in the SOI bonding process can be as high as 1200° C. However, in the case of sensor applications there may be a temperature constraint because the bonding has to be performed after fabricating the circuitry. In a known accelerometer fabrication process, a wafer with patterned cavity on it is bonded to the device wafer to restrict the displacement range of the proof mass. The 1200° C. step is too high for the device wafer which already contains circuitry metallized with aluminum. The Al/Si eutectic temperature is 577° C. which requires the wafer bonding temperature to be lower than 577° C.

With this temperature constraint in mind, glass has been used as the backing substrate for micromachined silicon pressure sensors because the bonding process can be performed at temperatures below 500° C. Glass to silicon bonding also offers a high bond strength for the finished devices. The major drawback in using a glass-to-silicon bond is the mismatch of the thermal expansion coefficients of these two materials. Since the glass was bonded to silicon at elevated temperatures, usually higher than 300° C., a built-in stress already existed in the silicon when the bonded pair was cooled to room temperature. It is known that the physical properties of silicon, such as resistivity and stiffness, depend on its stress condition. Therefore, the mismatch in thermal expansion coefficients can introduce pre-loaded stress problems in the bonded silicon wafer where the resistivity and/or mechanical stiffness of the silicon are the parameters to be monitored in sensor applications.

Under the same temperature constraints, Field et al, "Fusing Silicon Wafers with Low Melting Temperature Glass," Sensors and Actuators, A21–A23, p.935, 1990, deposited boron glass as the bonding agent between two wafers and was able to bond wafers together at 450° C. No data on bond strength was given. However, it seems the bonded pair can pass the scribe-and-break test. Because boron glass absorbs moisture very fast and the moisture content in the glass affects the bonding results significantly, we abandoned this approach after several attempts. At even lower temperatures, others have developed procedures and self-contained equipment to bond two wafers at room temperature. However, the bond strength between the wafers was not very high.

Thus, heretofore there has been a need for a low temperature, below 500° C., silicon wafer-to-wafer bonding process with enhanced bond strength.

SUMMARY OF THE INVENTION

In general, the invention includes a process for silicon wafer-to-wafer bonding at temperatures lower than 500° C. The process includes the steps of (1) treating the cleaned surfaces to make them smooth and hydrophilic, (2) initiating the bond by making intimate contact between wafers and (3) enhancing the bond strength at elevated temperatures below 500° C. This bonding process can be applied to sensor packaging.

These and other objects, features and advantages of the instant application will become apparent from the following brief description of the drawings, detailed description and appended claims and drawings.

DETAILED DESCRIPTION

Figure 1:
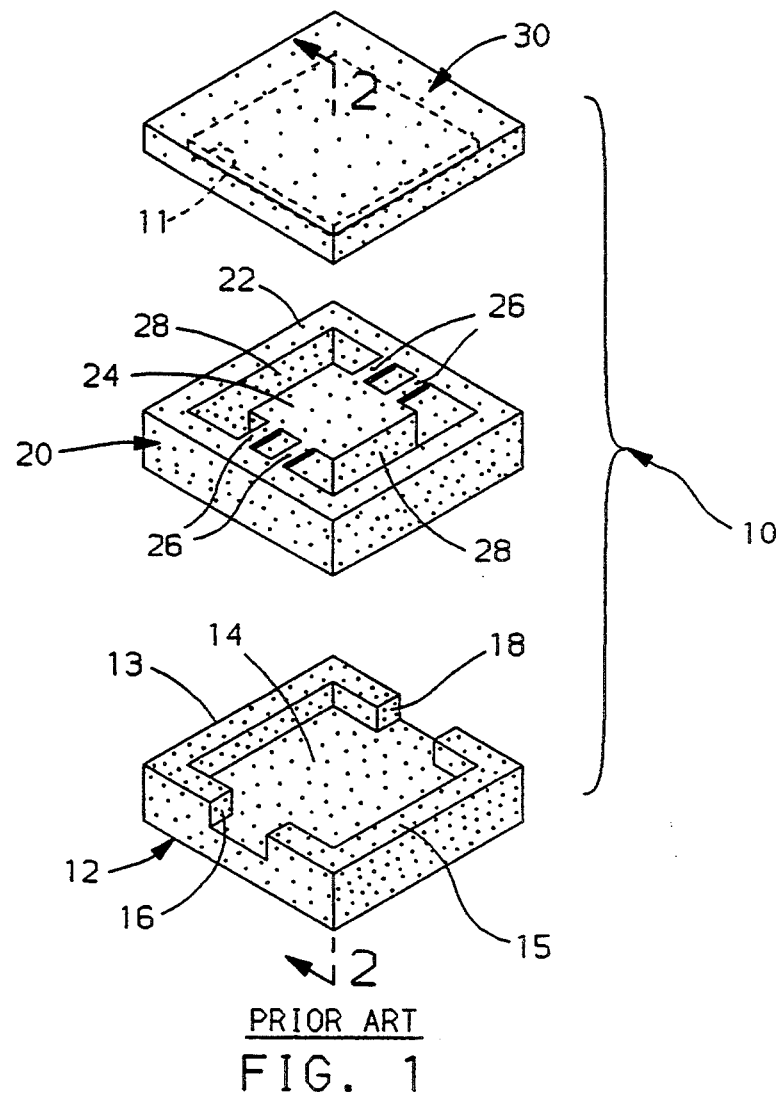
FIG. 1 illustrates a bottom wafer which defines an air path, a device wafer of a prior art accelerometer and a top capping wafer.

As illustrated in FIG. 1, an accelerometer 10 is composed of a bottom silicon wafer 12, a middle silicon wafer 20 and a top silicon wafer 30. The wafer 12 has a pair of opposed shoulders 13, 15 defining a central cavity 14 and opposed channels 16, 18 formed in the wafer and communicating with the central cavity 14 for the passage of air or gases. The central cavity 14 and opposed channels 16, 18 can be formed by selectively etching the wafer. A middle silicon wafer 20 includes support shoulders 22 and a proof mass 24 which are connected together by thin bridges 26 and a thin membrane (not shown) which extends between the support structure, proof mass and bridge where cavity 28 in FIG. 1 is formed. The support shoulders, bridges, proof mass and thin membrane are also formed by selectively etching the middle silicon wafer. The bridges 26 have resistors (not shown) formed thereon which are used to correlate the amount of deflection of the proof mass. Four bridges are shown in FIG. 1. However, the number of bridges can be reduced to one, i.e., the bridge and the proof mass can form a cantilever. At a predetermined deflection of the proof mass, an electric signal is sent to activate items such as air bags upon extreme acceleration. Often, the front side of the wafer 10 contains circuitry (not shown) connected to the resistors on the bridges for detecting movement of the proof mass and sending the associated signal. The cavity 14 formed in the lower wafer 12 and the cavity 11 formed in the upper wafer 30 allow a clearance for movement and damping of the proof mass 24.

Figure 8A:
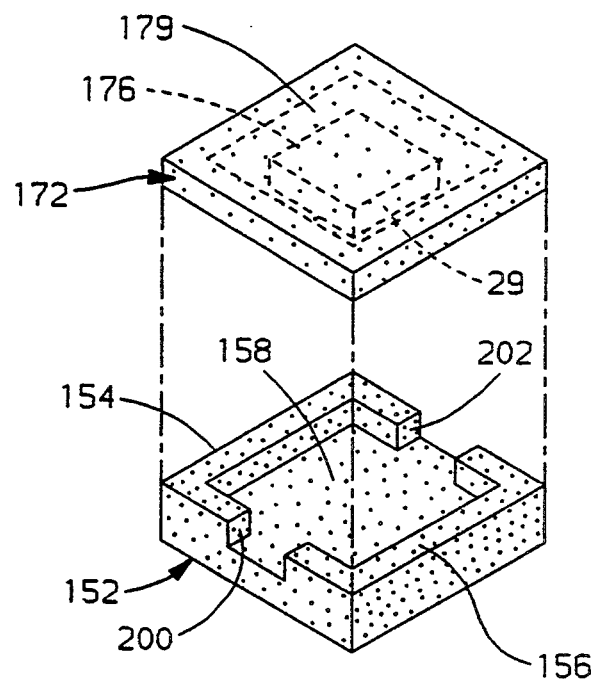
FIGS. 8a–8c are enlarged views of a bridge-supported accelerometer structure and illustrating steps of making the same according to the present invention.
Figure 8B:
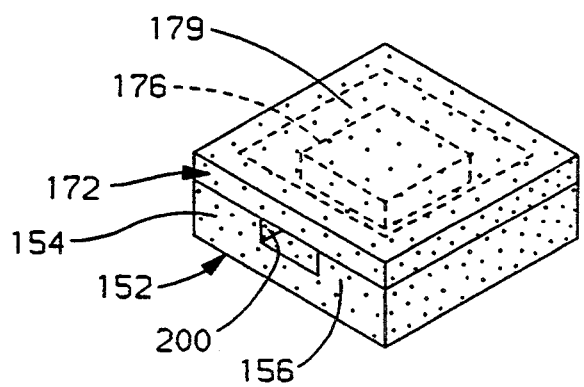
Figure 8C:
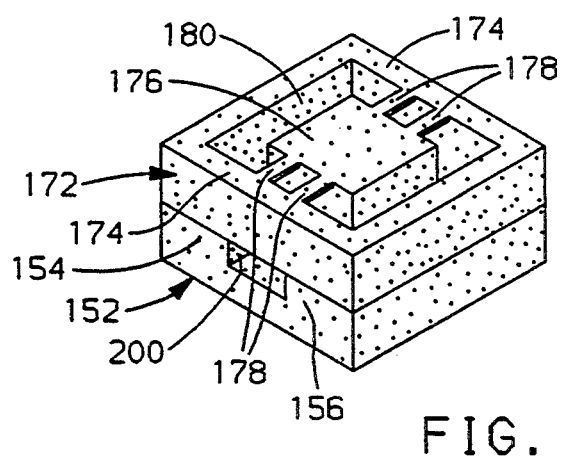

The wafer which includes the proof mass 24 is very difficult to handle without destroying once the bridges have been formed. A solution according to the present invention is described hereafter when reference is made to FIGS. 8a–8c.

Figure 2:
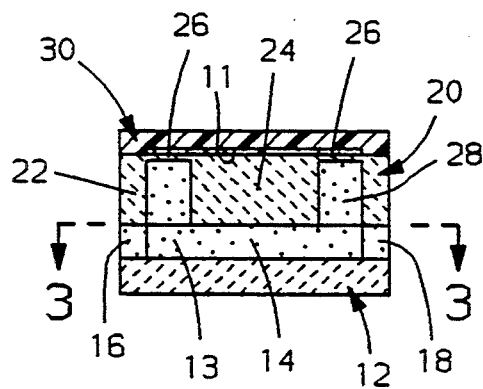
FIG. 2 is a sectional view taken along line 2—2 of FIG. 1, and illustrating a slit in the prior art accelerometer.
Figure 3:
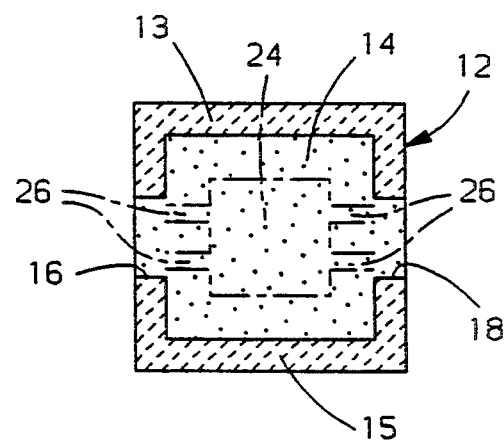
FIG. 3 is a sectional view taken along line 3—3 of FIG. 2, and illustrating the relationship of the bottom wafer cavity and the suspended proof mass (shown in phantom lines)

FIG. 2 is a side view taken along line 2—2 of FIG. 1 and illustrating a slit 16 (which is the same as channels 16, 18) which is left after the top and bottom wafers have been bonded together. This slit could cause reliability problems due to contaminants entering in the slit and being trapped inside the cavity. If an encapsulation material is used to fill the slit, the encapsulation material may enter the central cavity 14 and affect the reliability, accuracy and performance of the accelerometer. Thus, there has been a need for a method of wafer bonding and sealing silicon die that overcomes the disadvantages of the prior art.

Figure 4:
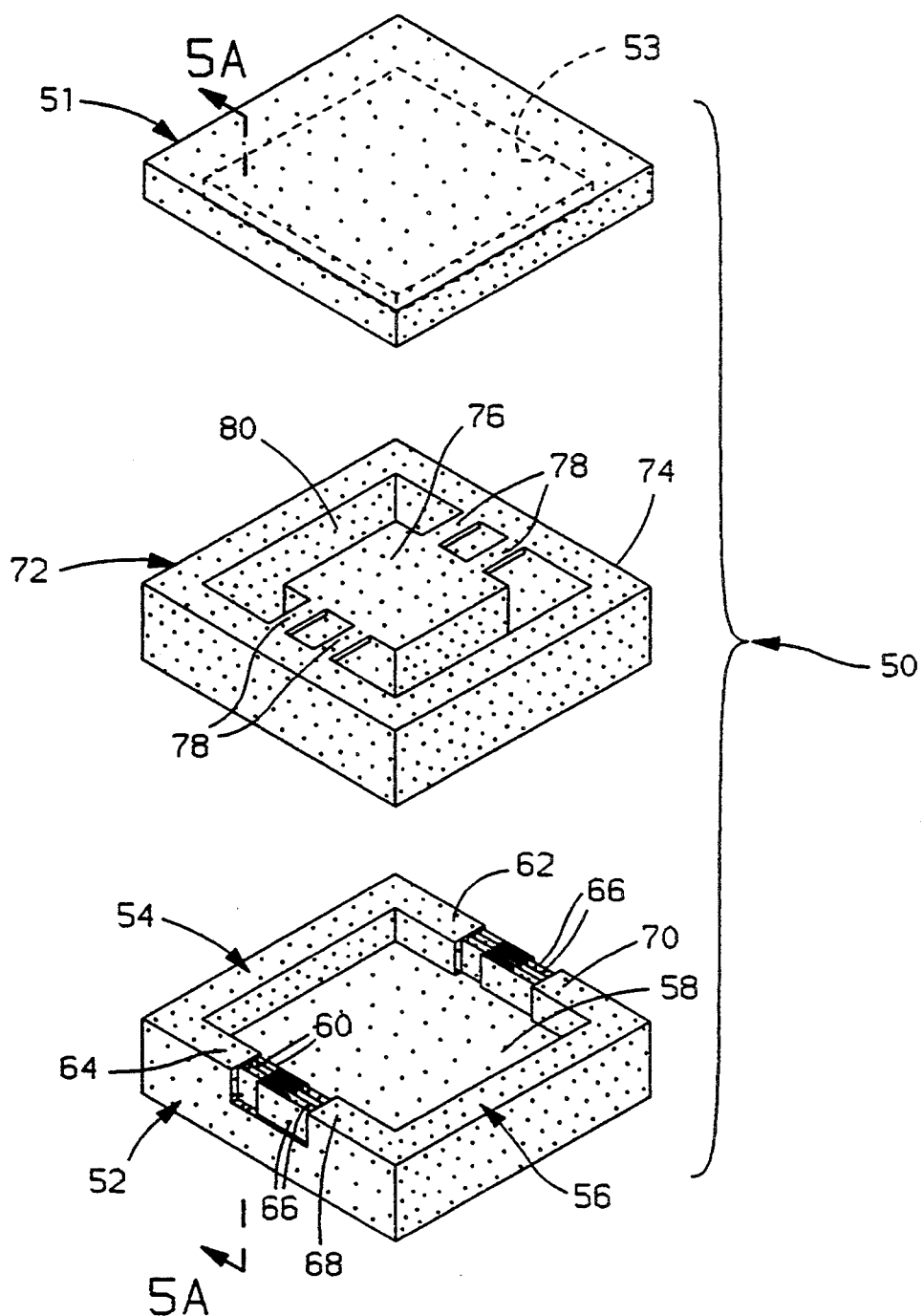
FIG. 4 illustrates the bottom, middle and top wafers of a device according to the present invention including a venting path formed by interdigitated fingers.
Figure 5A:
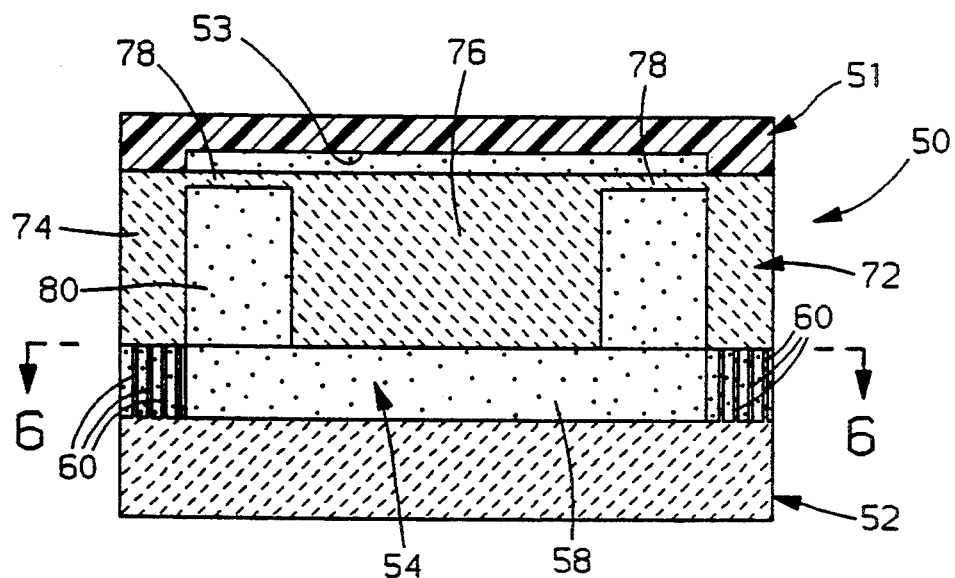
FIG. 5(A) is a sectional view taken along line 5—5 of FIG. 4.
Figure 6:
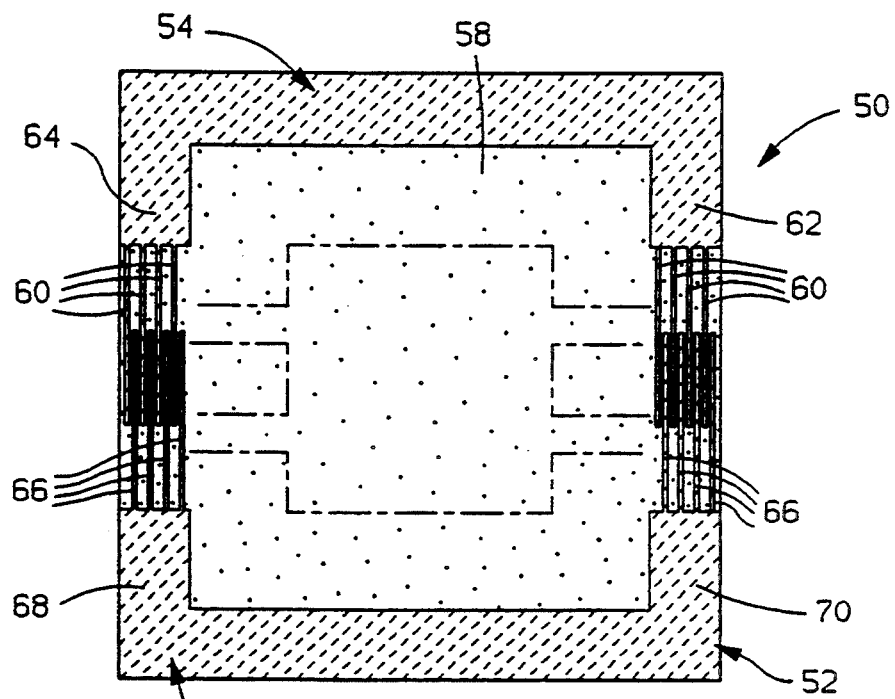
FIG. 6 is a sectional view taken along line 6—6 of FIG. 5(A) and illustrating interdigitated fingers, and the relationship of the bottom wafer cavity and the suspended proof mass according to the present invention.

As illustrated in FIGS. 4, 5(A) and 6, a device according to the present invention, such as an accelerometer 50, is composed of a top wafer 51, device wafer 72 and bottom wafer 52. The bottom silicon wafer 52 has a pair of first and second opposed U-shaped shoulders 54, 56 respectively defining a central cavity 58 with serpentine vents formed by a set of interdigitated fingers 60, 66 for the passage of air.

Figure 5B:
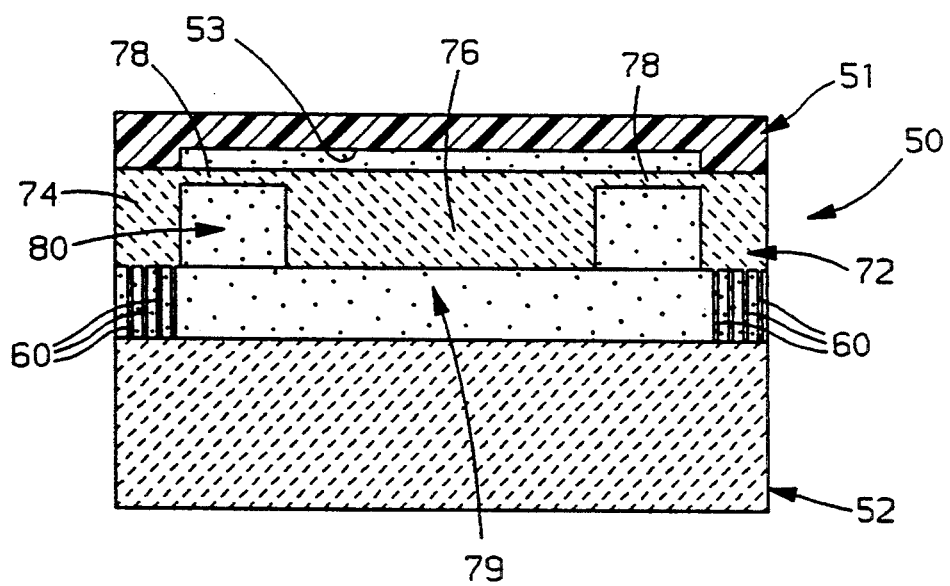
FIG. 5(B) is a sectional view of a variation of the bonded wafers, where a cavity and serpentine structure were formed on the backside of the device wafer.

The first set of spaced apart fingers 60 extend outwardly from the first U-shaped shoulder 54 at each end 62, 64 towards the second shoulder 56. Likewise, the second set of spaced apart fingers 66 extend outwardly from the second U-shaped shoulder 56 at each end 68, 70. The associated set of spaced apart fingers from each shoulder overlap to provide interdigitated fingers at opposed sides of each device that provide a serpentine air path communicating with the central cavity 58. Thus, a complete air path is provided from one side of the bottom wafer through a first set of interdigitated fingers, through the central cavity, through a second set of interdigitated fingers and repeating this pattern to the opposite side of the wafer. The central cavity and the interdigitated fingers or serpentine path can be formed at the same time by selectively etching the lower silicon wafer. It is important to form a vent path between wafers 52 and 72 with a serpentine structure as a barrier for the sealing material used in the final packaging. The etched depth of the serpentine structure can be different from the depth of the cavity. The serpentine structure and the cavity do not have to be on the same wafer. One can be on the bottom wafer and the other on the back side of the device wafer, as long as they are connected and communicate with each other to form a continuous vent path. As shown in FIG. 5(B), a variation would be to incorporate the serpentine structure and the recessed proof mass on the backside of the device wafer. Patterning of the bottom capping wafer and subsequent wafer-to-wafer alignment would not be required. A middle silicon wafer 72 includes a rectangular-shaped support structure 74 and a proof mass 76 which is connected to the support structure by thin membrane bridges 78. As described above, a thin membrane which extends between the rectangular shaped support structure 74, proof mass 76 and bridges 78 so that the middle wafer can be handled without breaking the bridges 78. When the wafers are bonded together, the membrane is removed to form a cavity 80 between the rectangular support structure 74, proof mass 76 and bridges 78. The bridges have resistors (not shown) formed thereon which are used to measure the amount of deflection of the proof mass. At a predetermined deflection of the proof mass, an electronic signal is sent to activate items such as air bags upon extreme acceleration in an automobile. The front side of the device wafer has circuitry connected to the resistors formed on the thin membrane bridges for detecting movement of the proof mass and sending an associated signal to activate devices such as the air bag. The cavities 53, 58 formed both in the upper and lower silicon wafers respectively allow a clearance for movement and damping of the proof mass. In FIG. 5(B), the cavity 53 of the top wafer and the cavity 79 of the device wafer allow a clearance for movement and damping of the proof mass.

Figure 7:
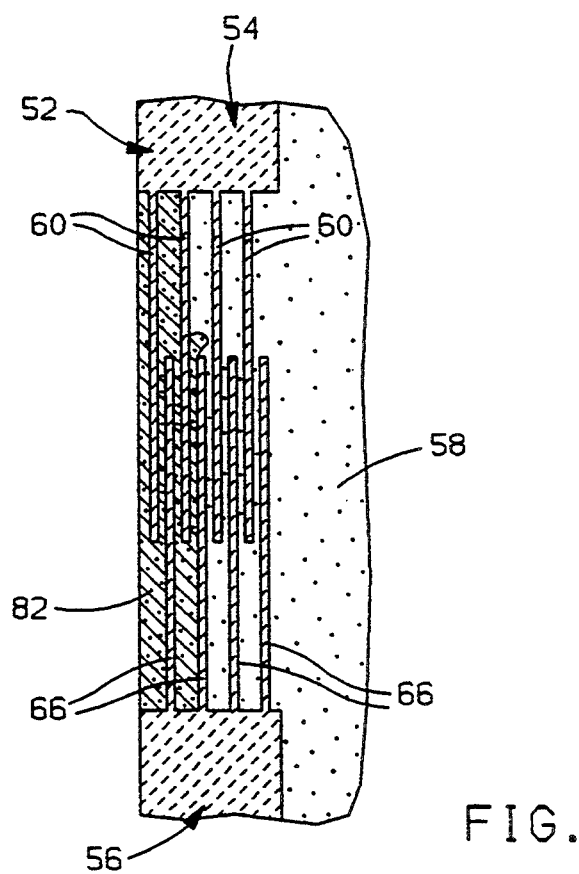
FIG. 7 is an enlarged, partial view of the bottom wafer illustrating the interdigitated fingers with an encapsulation material filling some of the gaps between the interdigitated fingers.

The bottom, middle and top silicon wafers may be bonded together by any of a variety of methods known to those skilled in the art and also by the method described hereafter. Once bonded together and sawn into die, the device may be sealed by a dielectric material or encapsulation material 82 such as epoxy, super glue or a silicon composition such as SYLGARD TM (available from Dow Corning Corporation). This can be accomplished by simply dipping the bonded chips into the sealing material and heating them to have the sealing material cured. The serpentine path formed by the interdigitated fingers prevents the sealing composition from flowing into the central cavity and obstructing the movement of the proof mass. Usually, seepage or movement of the sealing material through the serpentine path is naturally stopped approximately in the middle of the serpentine path formed by the interdigitated fingers as shown in FIG. 7.

As indicated above, the silicon wafers may be bonded together by a variety of techniques. Using the structure shown in FIG. 4, a first wafer which has the circuitry, thin membranes and metal connections for the accelerometer will hereafter be referred to as the device wafer. A second wafer which has the venting cavities formed in it will be referred to as the bottom wafer.

In another embodiment of the invention, a double-sided polished silicon wafer is used for the device wafer. After the necessary process steps, circuits with interconnect metal, such as aluminum, and membranes are formed on the device wafer. It is preferred to have a uniform layer of silicon dioxide on the backside of the wafer. The device wafer could be then placed into a plasma chamber to have the front side coated with a conformable film of pinhole free silicon nitride with thicknesses on the order of a few hundred nanometers at temperatures below 350° C. The bottom wafer contains the patterned venting cavity and is preferred to have a uniform thermally grown silicon dioxide on the front side of the wafer. The combined thickness of the oxides of the device wafer and the bottom wafer may range from a few tenths of nanometers to a couple hundred of nanometers. The two wafers are cleaned, rinsed, dried, and rinsed again with 18 megaohm-cm of deionized water. Typically the wafers are rinsed for about 240 seconds, spun dried for about 100 seconds and with monolayers of moisture left on the wafers. The two wafers are put into a plasma etching chamber with the sides to be bonded facing the plasma.

The wafers are etched by low energy ions bombardments to smooth and make their surfaces hydrophilic.

Once the plasma is ignited, the thin layer of moisture left on the wafers after removing them from the dryer helps the lateral flow of impinging ions and also avoids the ion charging effects which can consequently damage the electrical integrity of the oxide. It is important not to have high energy ions bombarding the wafer surfaces and creating damage. A low power should be utilized during the plasma etching step. Typical power density used for the etching is about 60 mW/cm$^2$ with a plasma potential of about $-50$ V. The gases used to generate the plasma are chemically inactive at room temperature, such as oxygen, argon or the mixture of the two. A variety of plasma potentials may be utilized, however, it has been found that plasma potentials more negative than $-100$ V result in damage to the wafer surfaces and lower wafer bonding strength is achieved. Argon, oxygen and mixtures of argon and oxygen may be utilized for the plasma etching. During the etching, the chamber pressure is kept at about 15 to 20 milli Torr when operated in the reactive ion etching (RIE) mode and is kept at about 400 milli Torr when operated in the plasma mode. Depending on the wafers smoothness and the chamber pressure during the etching, the time used in etching could range from one to ten minutes.

After smoothing the surfaces, the wafers are put into a chemical solution to make the surfaces more hydrophilic. The solution used is a mixture of $H_2O_2$:$NH_4OH$:deionized water in a ratio of 1:2:3 by volume which is heated to a temperature between 50° to 57° C. The wafers are immersed in the solution for approximately 15 minutes. The silicon nitride coating on the front side of the device wafer will protect the metal interconnects from attack by the chemical solution. If there is no silicon nitride coating on the front side of the device wafer, the wafer does not need to be in the 1:2:3 solution. The sequence of the surface treatments mentioned in the above example was to do the plasma etching prior to the 1:2:3 soaking. This sequence can be reversed. We have tried both ways and found both sequences gave satisfactory bonding results.

The wafers are then rinsed in deionized water to remove the chemical residues and then are put into a rinser and dryer to clean and dry the wafers. Typically, the wafers are rinsed for about 120 seconds and are dried for 80 seconds so that some moisture is still left on the wafers. The wafers are then put together and aligned for bonding. The wafers are left together in the aligned position for approximately an hour with or without a dead weight on them. The wafers are then placed in a furnace for bonding strength enhancement. The bonding enhancement step can be conducted at a temperature from about 100° to 480° C. for 30 minutes to an hour. The higher the temperature the shorter the time needed. After finishing all the steps, the typical tensile bonding strength is about 50 kg/cm$^2$. Thus, according to the present invention, a silicon wafer for bonding process at a temperature below 500° C. is accomplished with suitable tensile bonding strength. This is advantageous because metal interconnects such as aluminum are used in the devices wafer, and because the aluminum/silicon eutectic temperature is around 570° C. Thus, the present process overcomes the problems of prior art silicon wafer bonding processes where adhesives were used to glue wafers together.

The wafer 20 (FIG. 1) which includes the proof mass 24 is very difficult to handle without destroying once the bridges 26 have been formed. This difficulty is overcome by using a new process according to the present invention which combines backside bulk micromachining, front side plasma etching, and wafer to wafer bonding. A first wafer 172 (FIG. 8a) is bulk micromachined to provide a proof mass 176 supported on all sides by a thin membrane 179 which has the same thickness as the desired bridge thickness. The thin membrane 179 (where cavity 180 is formed) helps to make the structure more robust prior to bonding to the bottom silicon wafer. The first wafer 172 (FIG. 8a) is then bonded to the bottom wafer 152 which has a cavity 158 defined by opposed U-shaped shoulders 154, 156 and open channels 200, 202 communicating with the cavity 158 formed therein. This combination (FIG. 8b) provides a much less fragile structure than the first wafer alone. Plasma etching is then used to delineate bridges 178 (FIG. 8c) in the thin membrane so that the bridges extend from a support shoulder 174 to the proof mass 176. The cavity in the bottom wafer provides damping of the proof mass which reduces bridge breakage as portions of the thin membrane are etched away, leaving the final bridge-supported accelerometer structure. The fabrication can then be completed using the more robust structure provided by this new etch/bond/etch process.

The embodiments of the invention in which an exclusive property or privilege is claimed are defined as follows:

1. A method of silicon wafer-to-wafer bonding, the method comprising the steps of:
    providing a first wafer having an electric circuit formed from conductive materials including aluminum;
    providing a second wafer;
    treating a surface of the first wafer and a surface of the second wafer so as to create hydrophilic surfaces, the treating step comprising a plasma etch technique to smooth the surfaces and to make the surfaces hydrophilic, the plasma etch technique involving bombardment of the surfaces with ions of oxygen, argon or a combination thereof;
    placing the hydrophilic surfaces of the first and second wafers in contact with each other;
    heating the first and second wafers to a temperature below about 500° C. so that the first and second wafers are bonded together.

2. A method as set forth in claim 1 wherein the first and second wafer are heated to a temperature ranging from about 100° C. to about 480° C.

3. A method as set forth in claim 1 wherein the treating step further comprises the step of subjecting the surfaces of the first and second wafers to a substance so as to make the surfaces hydrophilic.

4. A method as set forth in claim 3 wherein the substance comprises $H_2O_2$ and $NH_4OH$.

5. A method as set forth in claim 3 wherein the substance comprises a solution of $H_2O_2$:$NH_4OH$:deionized water in a ratio of 1:2:3 by volume.

* * * * *